Aug. 28, 1962 H. W. WAGEMANN 3,051,082

DECIMAL POINT MECHANISM

Filed Aug. 17, 1959 2 Sheets-Sheet 1

INVENTOR.
HEINRICH W. WAGEMANN

BY George V. Hall

ATTORNEY

Aug. 28, 1962 | H. W. WAGEMANN | 3,051,082

DECIMAL POINT MECHANISM

Filed Aug. 17, 1959 | 2 Sheets-Sheet 2

INVENTOR.
HEINRICH W. WAGEMANN

BY [signature]

ATTORNEY

United States Patent Office 3,051,082
Patented Aug. 28, 1962

3,051,082
DECIMAL POINT MECHANISM
Heinrich W. Wagemann, West Orange, N.J., assignor to Monroe Calculating Machine Company, Orange, N.J., a corporation of Delaware
Filed Aug. 17, 1959, Ser. No. 834,123
7 Claims. (Cl. 101—93)

This invention relates to mechanism for printing a decimal point in conjunction with digital values.

Prior art listing and calculating machines have embodied mechanism for invariably priting a decimal point in a given location; usually between the tens and hundreds orders to provide for printing of dollars and cents. However, in certain instances it is desirable to print the decimal point in another location or to print the digital values without a decimal.

It is accordingly an object of the invention to provide mechanism for printing a decimal point at any one of a plurality of locations.

A further object of the invention is to provide means operable to enable and to disable mechanism for printing a decimal point at a given location.

Digit printing mechanism is normally not operable to print zeros to the left of the highest order significant digit but only to the right. There may be no significant digit to the left of a decimal point and one or more zeros between the decimal point and the first significant digit to the right. It is therefore another object of the invention to provide mechanism for printing zeros between the decimal point and the first significant digit to the right regardless of whether or not there is a significant digit to the left.

The printing mechanism herein disclosed is an improvement on the printing mechanism disclosed but not claimed in applicant's copending application Serial No. 819,174, filed June 9, 1959, and embraces principles of operation of printing mechanism disclosed but not claimed in applicant's copending application Serial No. 542,967, filed October 26, 1955, now Patent No. 2,917,232. In the present disclosure, parts corresponding to the parts of the disclosure of said application will be identified by like reference numerals.

In the present disclosure a single decimal point printing unit is shown and described. It will be understood however that a plurality of such units may be provided for operation at respective decimal locations as desired.

The foregoing and other objects and advantages of the invention will be understood from the following description with reference to the accompanying drawings in which.

Figure 1:
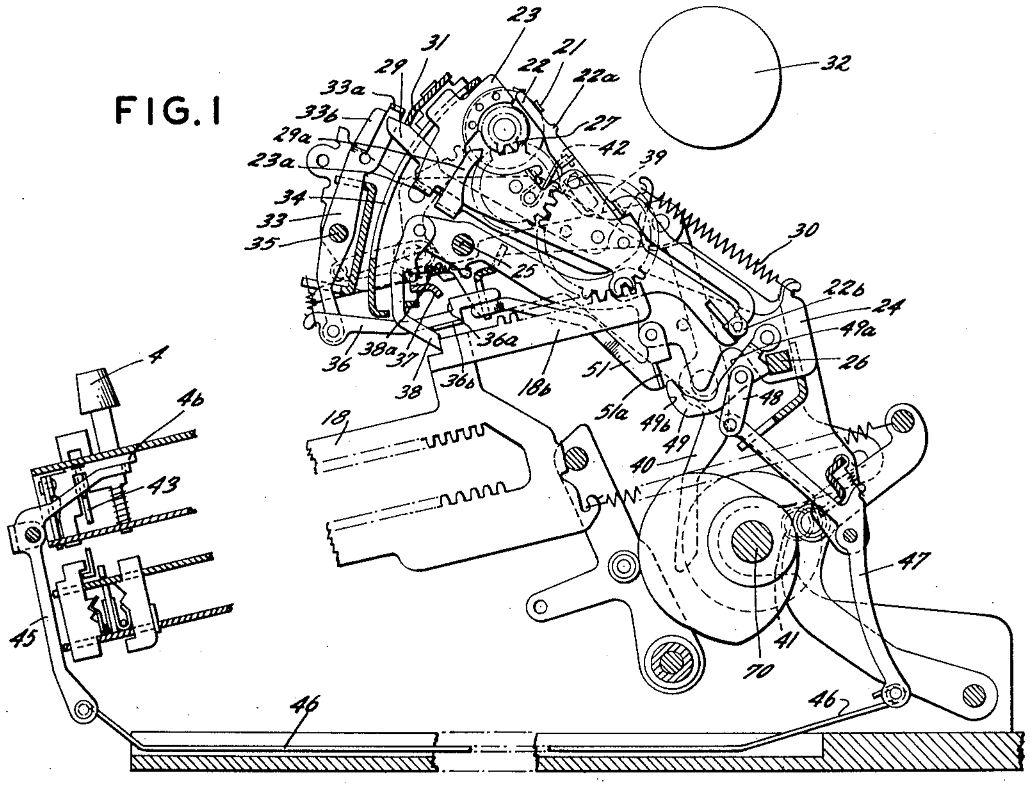
FIG. 1 is a side view of the printing mechanism with the parts in normal position.

The printing mechanism is disclosed as embodied in a calculating machine of the type disclosed in the aforenoted application Serial No. 819,174. It will be obvious however that the printing mechanism may be embodied in any listing machine or calculating machine including reciprocatory actuating racks to adjust the type members as is old and well known in the art.

Located to the right of and operatively associated with a given one of an ordinal series of normally disabled digit type wheels 21 (FIGS. 1, 3) is a normally disabled decimal point type member 22. Each type wheel 21 is mounted at the upper end of a hammer plate 23 which is pivotally mounted on a partition plate 24. Plates 24 are supported in spaced relationship on a pair of transverse rods 25 and 26. Each wheel 21 is rotatably adjusted by a rearward extension 18b of an associated rack 18 through a suitable gear train including a gear 27 fast with said wheel. A driving arm 29 is pivotally mounted on each hammer plate 23 and is spring urged clockwise by a spring 30. Arms 29 are normally held counterclockwise (FIG. 1) against the urge of springs 30 by a restore bail 31 engaging the upper ends of the arms which extend upwardly through a comb 34 carried by the bail.

Figure 3:
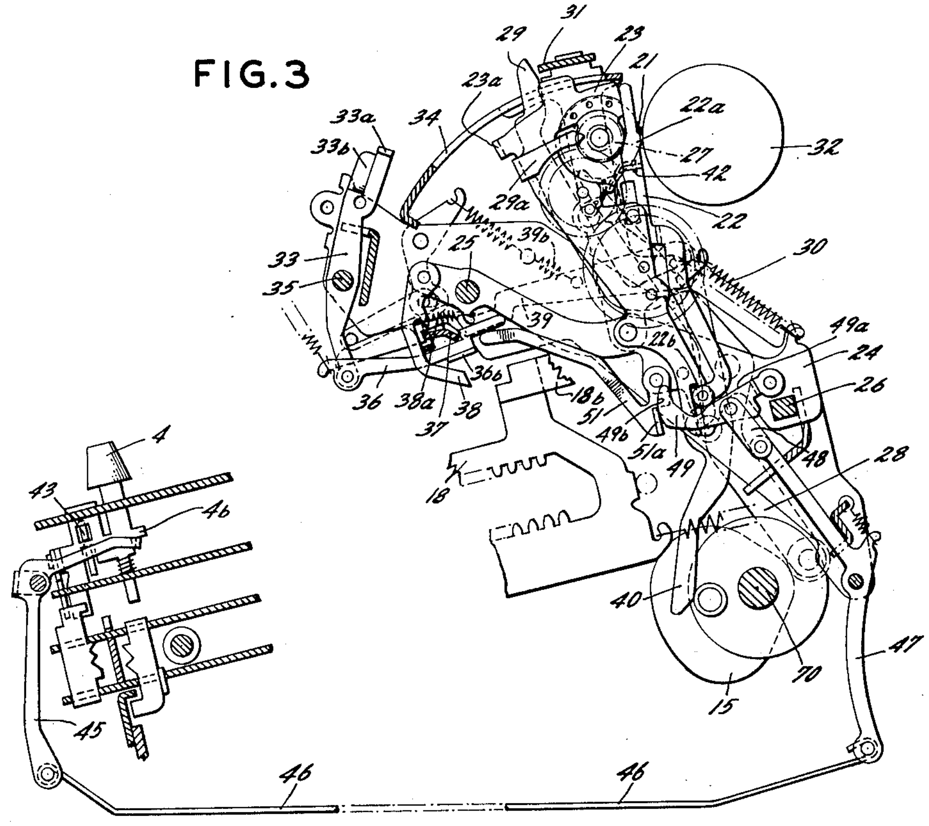
FIG. 3 is a side view of the printing mechanism with the parts in an operated position.

At the upper front edge of each plate 23 is a lug 23a which is adapted for engagement by arm 29. Therefore arm 29, held in counterclockwise position, will likewise hold plate 23. Below lug 23a on the front edge of arm 29 is a rearwardly extending finger 29a which embraces the front edge of plate 23. Consequently if arm 29 is released, it will be rotated clockwise and carry hammer plate 23 therewith to bring type wheel 21 thereon against paper on a platen 32 in a printing operation as shown in FIG. 3. In this operation, the rear end of finger 29a, which is wedge shaped, will detent gear 27 of wheel 21 thereby aligning the wheel. Driving arms 29 are controlled in a printing operation as follows.

Associated with each arm 29 is a trigger comprising a lever 33. Triggers 33 are pivotally mounted intermediate their ends on a transverse shaft 35 forwardly of comb 34. Pivotally mounted at the lower end of each trigger 33 is a rearwardly extending arm 36. A spring attached to a forward extension of arm 36 holds said arm in lowered position and trigger 33 normally clockwise (FIG. 1).

When triggers 33 are in normal clockwise position, lugs 33a at their upper ends are a short distance above and in the clockwise path of movement of drive arms 29, and when arms 36 are in normal lowered position (FIGS. 1, 2), shoulders 36a at their upper rear edges are below the path of movement of a depending bail 37.

Associated with each arm 36 and rack 18 is a depending lift finger 38 which is pivotally mounted at its upper end and is spring urged counterclockwise by a spring 38a to hold its lower end in engagement with a shoulder at the front of extension 18b of rack 18. Adjacent its lower end, finger 38 extends toward the rear and into engagement with the front underedge of a lug 36b at the underedge of arm 36.

If rack 18 moves toward the rear from its zero position in a registering or total taking operation, finger 38 will be released and will be moved counterclockwise by spring 38a. Counterclockwise movement of finger 38 will raise arm 36 thereby bringing shoulder 36a into the path of movement of bail 37.

During the first half of a machine cycle, as racks 18 are moved rearwardly to set values in wheels 21, restoring bail 31 will be rocked clockwise from engagement with driving arms 29 under control of a cam follower 28 (FIG. 3) which engages a cam 15 on the machine's main drive shaft 70. Arms 29 therefore will be moved by springs 30 into engagement with lugs 33a of triggers 33.

At midcycle, racks 18 will have completed their excursions and will dwell. During the midcycle dwell, normally disabled means is operable to rock bail 37 thereby effecting operation of the printing mechanism. The normally disabled means includes an upstanding lever 40 best seen in FIGS. 2 and 4. A forwardly extending arm 39 is pivotally mounted at its rear at the upper end of lever 40 and at its lower front end has a shoulder 39a adapted to engage the front edge of bail 37.

Figure 2:
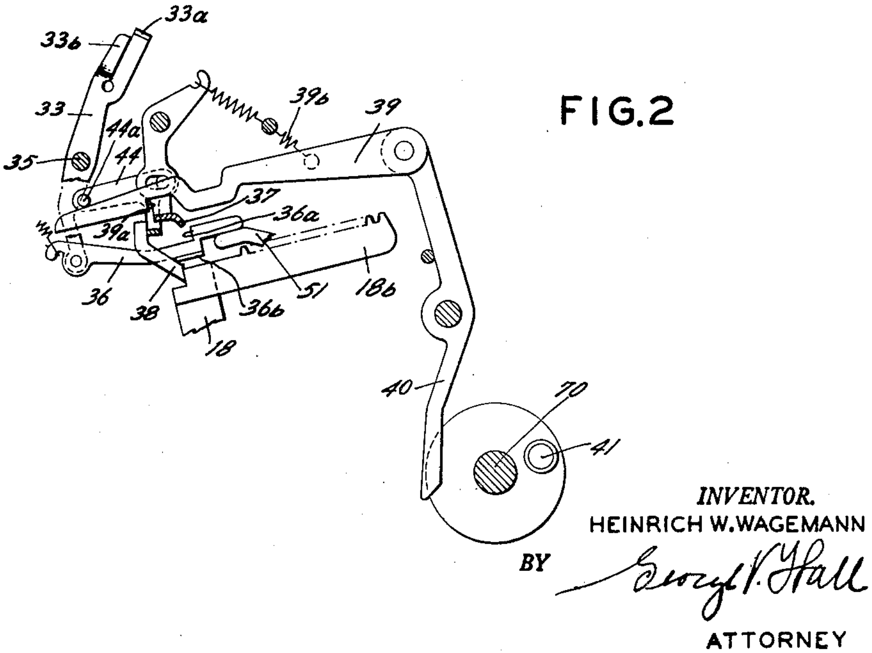
FIG. 2 is a detailed side view of the means for effecting operation of the printing mechanism with the parts in normal position.

A light spring 39b normally holds arm 39 forwardly and lever 40 counterclockwise (FIGS. 1, 2). Furthermore spring 39*b* holds the front end of arm 39 raised into engagement with a pin 44*a* at the end of a forwardly extending arm of a bail 44 which is pivotally mounted at 44*b*. Accordingly bail 44 is held clockwise and in engagement with the rear edges of depending fingers 38, and shoulder 39*a* of arm 39 will be positioned forwardly and above bail 37.

Figure 4:
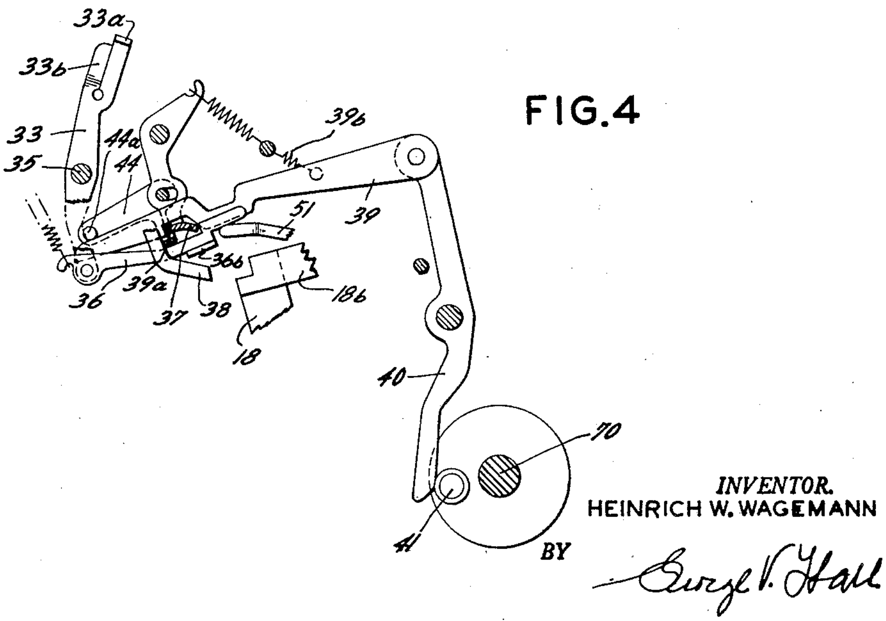
FIG. 4 is a detailed side view of the means for effecting operation of the printing mechanism with the parts in an operated position.

A roller 41 is mounted for rotation with the machine's main drive shaft 70. During the midcycle dwell of racks 18, roller 41 will briefly engage the lower end of lever 40 and rock it clockwise (FIGS. 3, 4). As a result, arm 39 will be moved rearwardly and restored. If all of the wheels 21 stand at zero as in a nonregistering operation, the front end of arm 39 will remain raised and upon rearward movement of the arm, shoulder 39*a* will pass idly above bail 37 and the printing mechanism will not be operated. Thus means is provided to prevent the unwanted printing of zeros in all of the orders when there is no significant digit registration. However, if any one of the digit type wheels has been moved from zero position, bail 37 will be rocked to effect operation of the printing mechanism as follows.

It will be noted that any one of springs 38*a* (FIGS. 1, 3), which hold fingers 38 counterclockwise in engagement with the shoulders of rack extensions 18*b*, is sufficiently strong to overcome relatively weak spring 39*b* of arm 39. Therefore when a finger 38 is rocked counterclockwise upon movement of the associated rack extension 18*b* toward the rear, bail 44 will be rocked counterclockwise (FIGS. 3, 4) and pin 44*a* will be effective to lower shoulder 39*a* of arm 39 into position to engage and rock bail 37 upon rearward movement of said arm.

In all of the orders in which racks 18 have moved, arms 36 will be raised to bring their shoulders in the path of bail 37 (FIGS. 3, 4). Consequently when bail 37 is rocked, the raised arms will be moved rearwardly thereby rocking the connected triggers 33 counterclockwise to remove their lugs 33*a* from holding engagement with driving arms 29 which will then be fired to effect a printing operation. Fingers 33*b* of triggers 33 overlap each successive higher order trigger. Therefore when a trigger is rocked by bail 37, the successive lower order triggers, if not rocked by the bail, will be rocked by the overlapping fingers to provide for printing of zeros to the right of any significant digit in the usual manner. After the printing operation, the parts will be restored during the last half of the machine cycle. It will be noted that the above described digit printing mechanism and its operation is conventional and well known in the art. The decimal printing means operable therewith will now be described.

Each decimal point type member 22 (FIGS. 1, 3) is in the form of a slide having slot and pin mounting intermediate its ends on one of the hammer plates 23 and having a reversely turned lowered end engaging a guide slot at the lower end of said plate. The upper end of slide 22 is stepped toward the right and extends upwardly to the right of digit type wheel 21 on plate 23. A decimal type 22*a* is carried by the upper rear edge of slide 22 and is therefore located immediately to the right of the associated digit type wheel 21.

Normally slide 22 is held in a lowered position (FIG. 1) by a torsion spring 42 and when in this position decimal type 22*a* is below the printing line. Consequently if plate 23 is fired, type 22*a* will not be brought to the platen and the digit will be printed without a decimal to the right. Means is operable to adjust slide 22 to a raised position thereby enabling decimal type 22*a* by bringing it to printing line position as follows.

The decimal point printing means is enabled upon depression of a key 4 which is spring retracted. Key 4 is held in depressed position by a latch slide 43 and is released by movement of the slide upon depression of a release key (not shown). These operations, well known in the art, are fully disclosed in the aforenoted application Serial No. 819,174.

A rearward extension 4*b* of the stem of key 4 overlies the end of a horizontal arm of a bell crank 45. A depending arm of crank 45 is connected to the front end of a cable 46 which is connected at its rear end to the lower arm of a lever 47 comprising one leg of a toggle. An upper arm of lever 47 is pivotally connected to the lower end of a link 48 comprising the other leg of the toggle. The end of link 48 is piovtally connected intermediate the ends of a forwardly extending cam arm 49 which has fixed pivotal mounting at its rear.

Normally lever 47 is spring held counterclockwise (FIG. 1) with the toggle comprising said lever and link 48 broken. With toggle 47—48 broken, cam arm 49 will be in a lowered disabled position, cable 46 will be held rearwardly and bell crank 45 will be held counterclockwise with its horizontal arm immediately below extension 4*b* of the stem of retracted key 4.

Upon depresison of key 4, extension 4*b* will rock crank 45 clockwise thereby pulling cable 46 forwardly. Forward movement of cable 46 will rock lever 47 clockwise thereby setting toggle 47—48 (FIG. 3). This setting action of toggle 47—48 wil be effective to rock cam arm 49 clockwise to enabled position.

Clockwise movement of cam arm 49 to enabled position will bring an upper cam edge 49*a* thereof into engagement with a roller 22*b* at the lower end of decimal slide 22. This movement is not operable to raise slide 22 but only sufficient to engage edge 49*a* wtih roller 22*b*. However as hammer plate 23 is rocked clockwise in a printing operation, roller 22*b* will be moved forwardly (FIG. 3) along cam edge 49*a* which is so inclined that slide 22 will be raised to bring decimal type 22*a* to printing line position before the moment of impact of digit type wheel 21 with the paper. A decimal therefore will be printed to the right of the digit.

It will be recalled that the firing mechanism for hammer plate 23 is enabled upon movement of rack 18 rearwardly from zero position. If there is no significant digit in the orders to the left of the decimal point, the value to be printed will comprise only decimal digits. Therefore when the decimal mechanism is enabled, means must be provided to enable the firing mechanism for plate 23 on which decimal slide 22 is mounted independently of the movement of rack 18. Otherwise the decimal would not be printed.

The means for enabling the firing mechanism independently of the movement of rack 18 comprises a forwardly extending finger 51 having fixed pivotal mounting at its rear and having its front free end underlying the rear end of arm 36. Adjacent its rear below its pivotal mounting, finger 51 has a lug 51*a* adapted for engagement by a cam edge 49*b* at the front free end of cam arm 49.

When arm 49 is moved clockwise to enable the decimal point mechanism, cam edge 49*b* will engage lug 51*a* thereby raising the front end of finger 51 and overlying arm 36. This will bring shoulder 36*a* into the path of movement of bail 37 thereby enabling the firing mechanism. A zero with a decimal point at its right therefore will be printed with decimal digits to the right of the decimal point, e.g., (0.1289). It will be noted that if there is one or more zeros between the decimal point and a first significant digit to the right, the overlapping fingers 33*b* will provide for printing of the zeros, e.g. (0.0025).

I claim:

1. In a business machine having printing mechanism including an ordinal series of digit type members each differentially settable from a normal position, spring means for operating each digit type member, a latch for restraining each digit type member from operation by said spring means, a comomn operating member, an adjustable releasing member for each latch normally out of the path of movemnet of said common operating member, and means operable upon movement of each digit type member from normal position to adjust the releasing member of the associated latch into the path of movement of said common operating member; a decimal point type member adjustably coupled to a given digit type member for operation therewith, means normally operable to adjust said decimal point type member to a disabled position, means for adjusting said decimal point type member to an enabled position, and means operable upon adjustment of said decimal point type member to enabled position to adjust the releasing member for the latch of the coupled digit type member into the path of movement of said common operating member.

2. In a printing mechanism including an ordinal series of digit type members each differentially settable from a normal 0 printing position, normally disabled operating means for each digit type member, means operable upon movement of each digit type member from normal 0 position to enable its said operating means, and means operable upon operation of said operating means for each digit type member to effect operation of the operating means for the next lower order digit type member when said lower order digit type member is in 0 position; a decimal point type member associated with one of said digit type member and located adjacent thereto, normally disabled operating means for said decimal point type member, means for enabling said operating means for said decimal point type member, and means operable upon enablement of said operating means for said decimal point type member to enable said operating means for said associated digit type member when said associated digit type member is in 0 position.

3. The invention according to claim 2 wherein said operating means for said decimal point type member includes said operating means for said associated digit type member.

4. The invention according to claim 3 wherein said decimal point type member is coupled to said associated digit type member.

5. In a printing mechanism including an ordinal series of digit type members each differentially settable from a normal 0 printing position, normally disabled operating means for each digit type member, means operable upon movement of each digit type member from normal 0 position to enable its said operating means, and means operable upon operation of said operating means for each digit type member to effect operation of the operating means for the next lower order digit type member when said lower order digit type member is in 0 position; a decimal point type member located adjacent an associated digit type member and adjustable from a normal lowered position to a raised printing line position, normally disabled operating means for said decimal point type member including means for adjusting said member to said raised position, means for enabling said operating means for said decimal point type member, and means operable upon enablement of said operating means for said decimal point type member to enable said operating means for said associated digit type member when said associated digit type member is in 0 position.

6. The invention according to claim 5 wherein said decimal point type member is slidably coupled to said associated digit type member for up and down movement.

7. In a printing mechanism including an ordinal series of digit type members each differentially settable from a normal 0 printing position, normally disabled operating means for each digit type member, means operable upon movement of each digit type member from normal 0 position to enable its said operating means, and means operable upon operation of said operating means for each digit type member to effect operation of the operating means for the next lower order digit type member when said lower order digit type member is in 0 position; a decimal point type member operable by an associated one of said digit type members and adjustable to ineffectively and effectively operable positions, means settable to position to adjust said decimal point type member to effectively operable position, and means operable upon setting of said settable means to enable said operating means for said associated digit type member when said associated digit type member is in 0 position.

References Cited in the file of this patent

UNITED STATES PATENTS

| | | |
|---|---|---|
| 1,763,650 | Gregory | June 17, 1930 |
| 1,763,699 | Green | June 17, 1930 |
| 2,416,707 | Metzner | Mar. 4, 1947 |
| 2,550,786 | Curtis | May 1, 1951 |
| 2,765,736 | Swanson | Oct. 9, 1956 |
| 2,802,415 | Heinze et al. | Aug. 13, 1957 |
| 2,872,862 | Lydfors | Feb. 10, 1959 |